(12) United States Patent
Cheng

(10) Patent No.: US 6,765,581 B2
(45) Date of Patent: *Jul. 20, 2004

(54) DISPLAY APPARATUS AND METHOD CAPABLE OF ROTATING AN IMAGE BY 180 DEGREES

(75) Inventor: Brett Cheng, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 09/733,732

(22) Filed: Dec. 7, 2000

(65) Prior Publication Data

US 2002/0021305 A1 Feb. 21, 2002

Related U.S. Application Data

(63) Continuation-in-part of application No. 09/036,482, filed on Mar. 6, 1998, now Pat. No. 5,956,049, which is a continuation of application No. 09/153,167, filed on Sep. 15, 1998, now Pat. No. 6,226,016, which is a continuation of application No. 08/596,953, filed on Feb. 5, 1996, now Pat. No. 5,734,875.

(51) Int. Cl.[7] .............................................. G06F 12/10
(52) U.S. Cl. .................................................... 345/568
(58) Field of Search ................................ 345/672, 658, 345/568, 564, 571, 566, 647, 576, 656, 659

(56) References Cited

U.S. PATENT DOCUMENTS

| 4,704,697 | A | * | 11/1987 | Kiremidjian et al. | ....... 364/518 |
| 4,727,497 | A | * | 2/1988 | Peters et al. | ................ 345/568 |
| 4,736,442 | A | | 4/1988 | Kornfeld | |
| 4,931,960 | A | * | 6/1990 | Morikawa | .................. 358/1.11 |
| 5,063,526 | A | * | 11/1991 | Kagawa et al. | ............. 395/155 |
| 5,068,904 | A | | 11/1991 | Yamazaki | |
| 5,095,422 | A | | 3/1992 | Horiguchi | |
| 5,146,592 | A | * | 9/1992 | Pfeiffer et al. | .............. 395/157 |
| 5,530,822 | A | * | 6/1996 | Beavers et al. | ............. 395/417 |
| 5,734,875 | A | * | 3/1998 | Cheng | ........................ 395/516 |
| 6,262,751 | B1 | * | 7/2001 | Chan | .......................... 345/572 |
| 6,608,626 | B2 | * | 8/2003 | Chan | .......................... 345/572 |

FOREIGN PATENT DOCUMENTS

WO    WO 97/28516    8/1997

* cited by examiner

Primary Examiner—Mark Zimmerman
Assistant Examiner—Scott A Wallace
(74) Attorney, Agent, or Firm—Mark P. Watson

(57) ABSTRACT

A system for translating a portrait-oriented software address to a portrait-oriented yet landscape-configured display address. Based on the orientation of a display device, a address translation system either passes the software address "as is" or translates the address to represent a portrait-oriented display address.

4 Claims, 12 Drawing Sheets

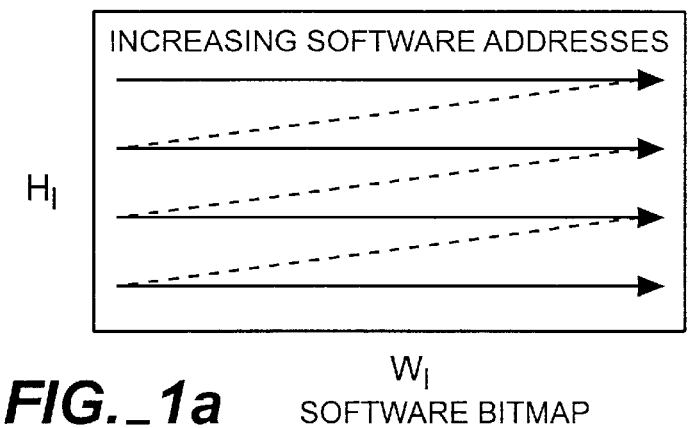
FIG._1a SOFTWARE BITMAP
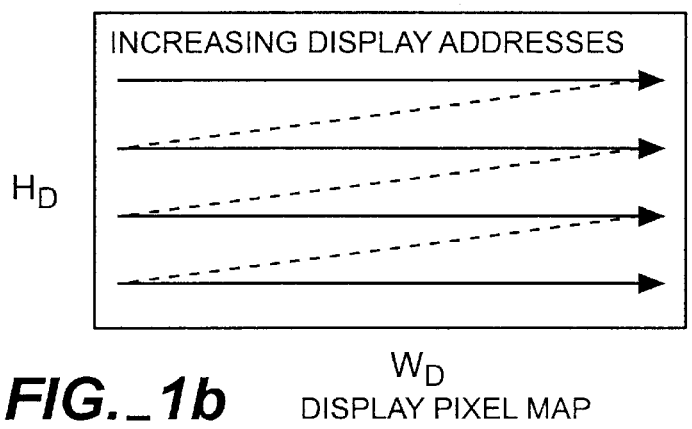
FIG._1b DISPLAY PIXEL MAP
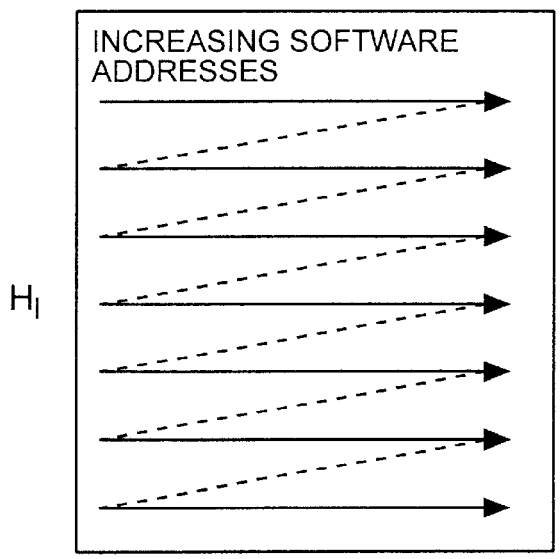
FIG._2a SOFTWARE BITMAP
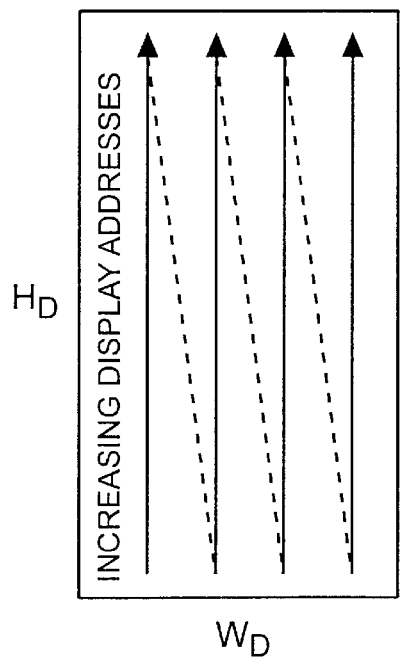
FIG._2b DISPLAY PIXEL MAP

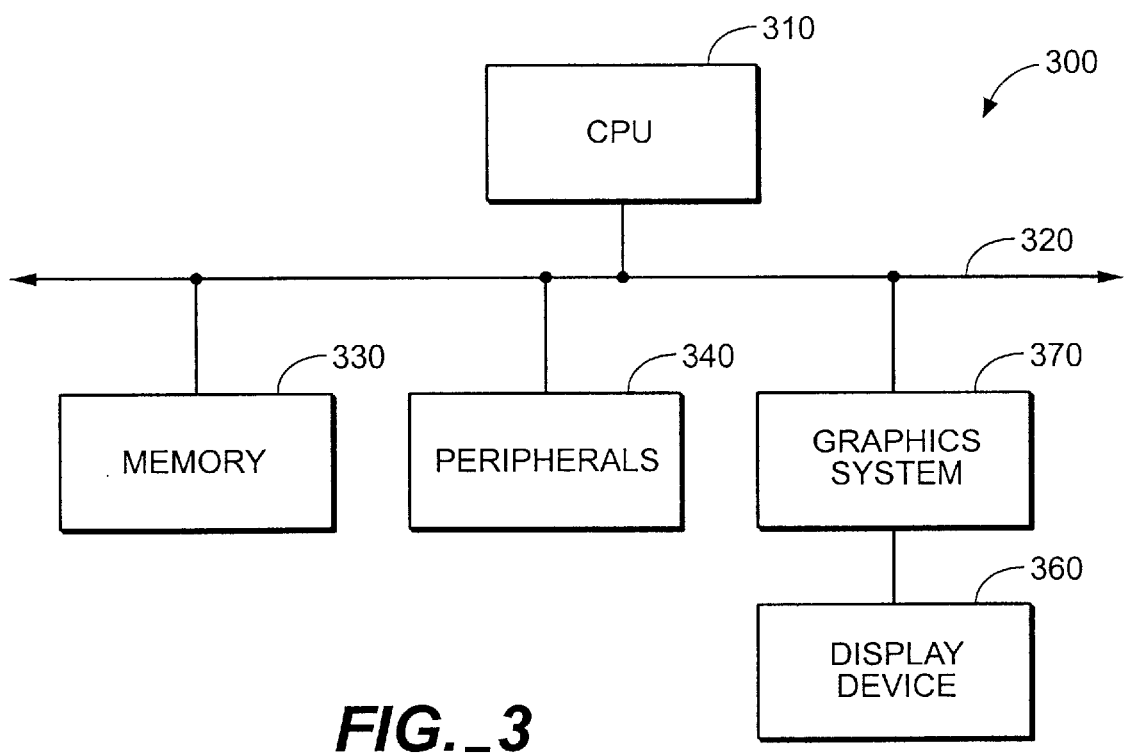
FIG._3

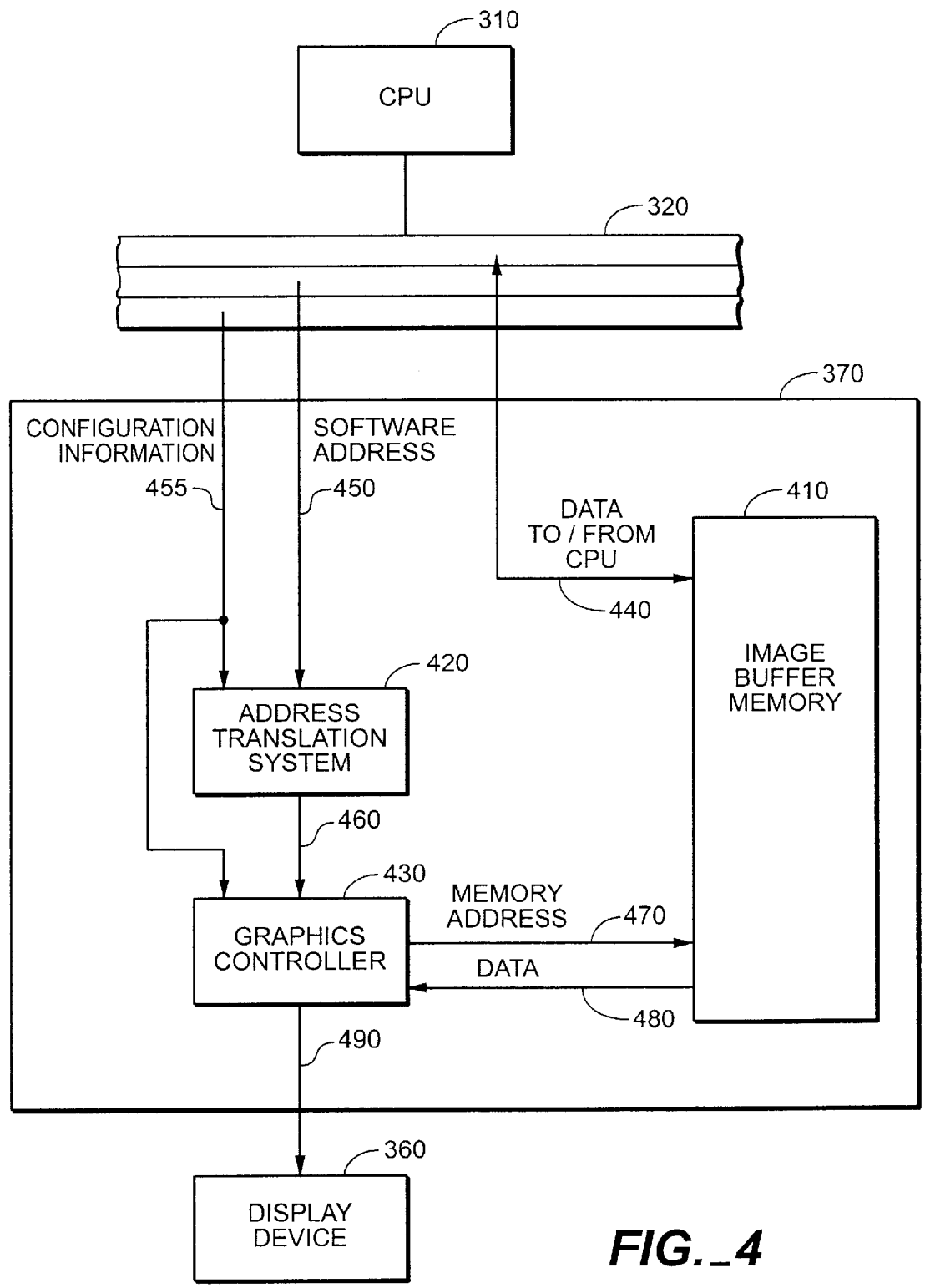
FIG._4

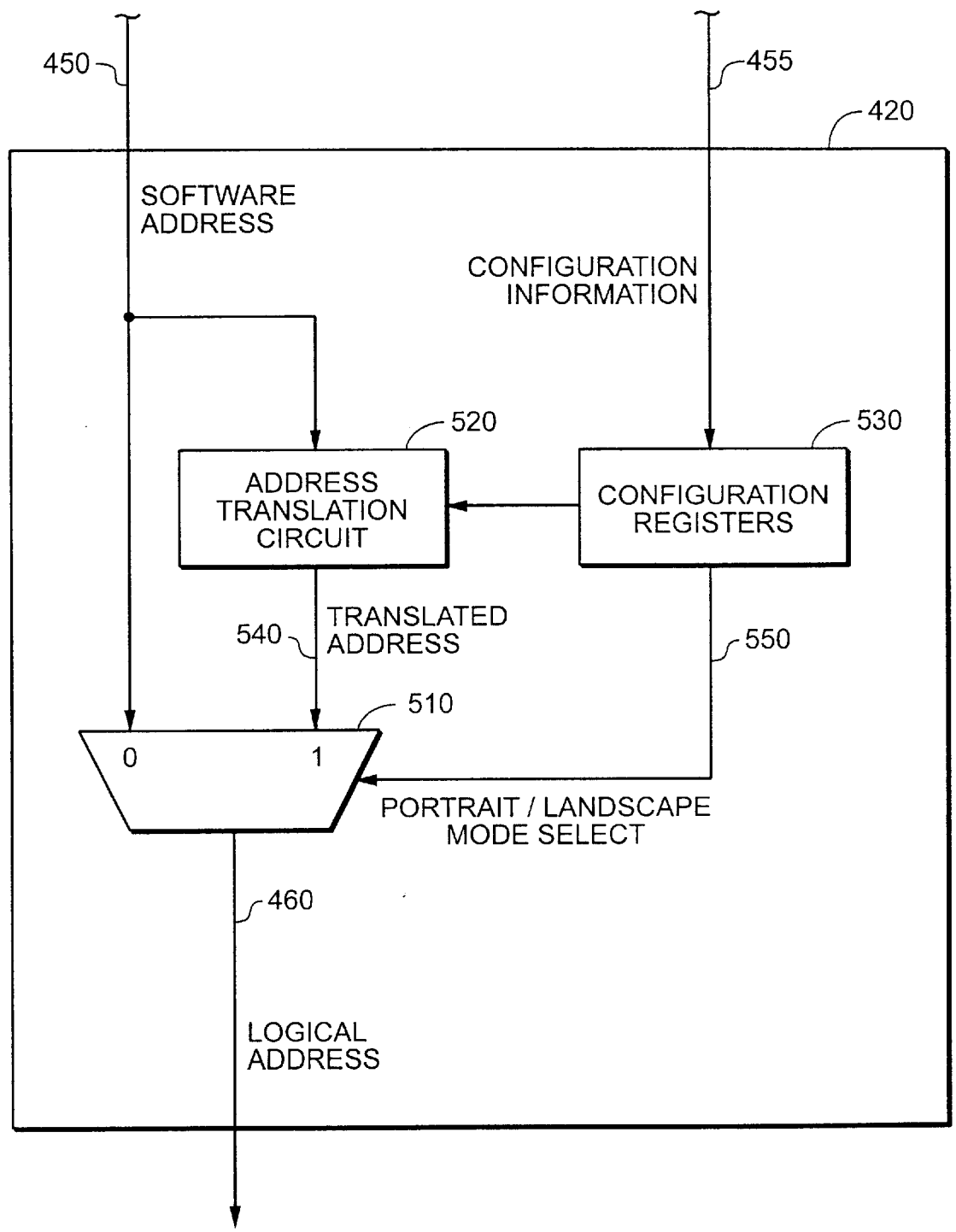
FIG._5

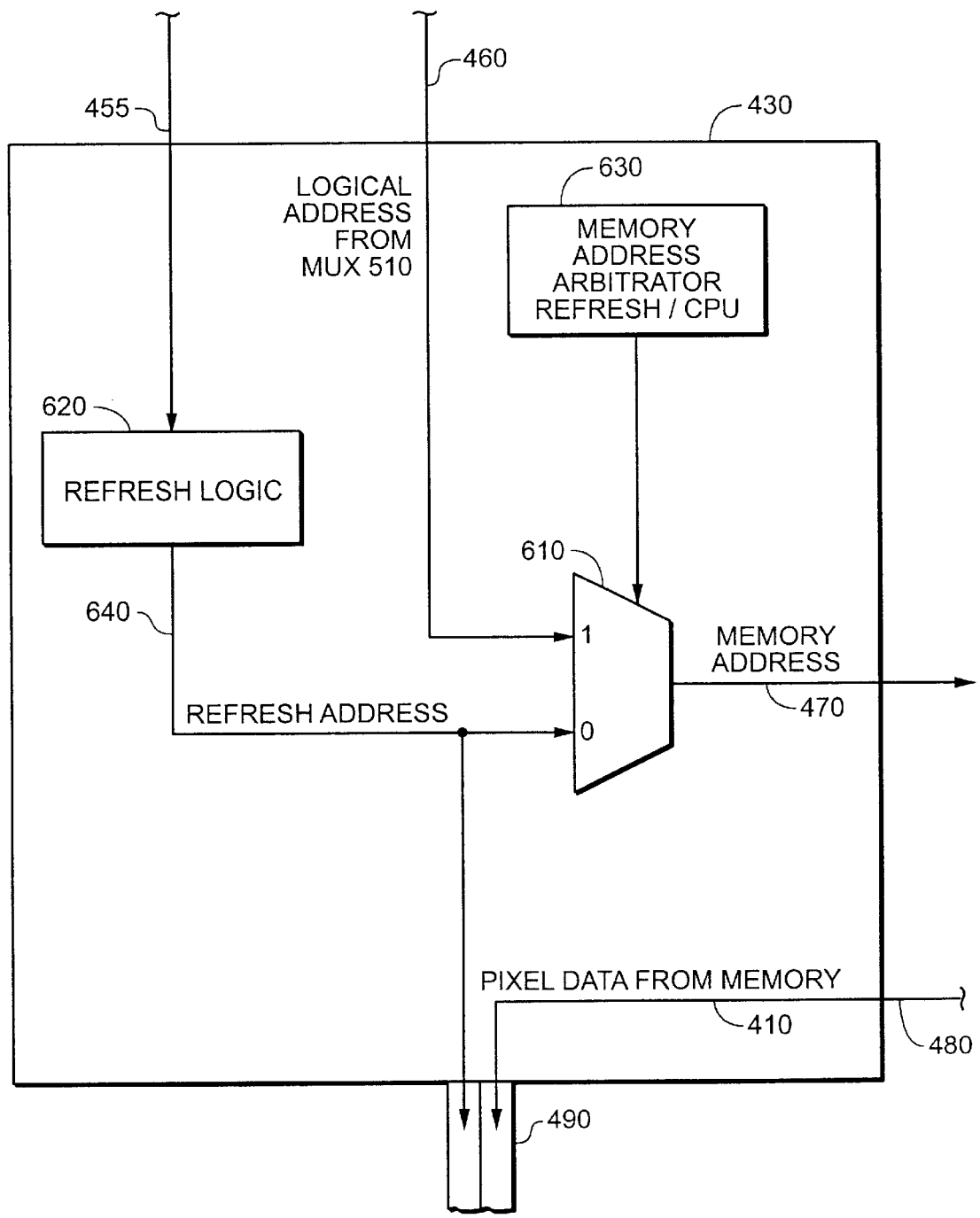
FIG._6

|   |   |   |   |   |   |   |   |
|---|---|---|---|---|---|---|---|
| 0 | 1 | 2 | 3 | 4 | 5 | 6 | 7 |
| 8 | 9 | 10 | 11 | 12 | 13 | 14 | 15 |
| 16 | 17 | 18 | 19 | 20 | 21 | 22 | 23 |
| 24 | 25 | 26 | 27 | 28 | 29 | 30 | 31 |

FIG._7a

|   |   |   |   |
|---|---|---|---|
| 7 | 15 | 23 | 31 |
| 6 | 14 | 22 | 30 |
| 5 | 13 | 21 | 29 |
| 4 | 12 | 20 | 28 |
| 3 | 11 | 19 | 27 |
| 2 | 10 | 18 | 26 |
| 1 | 9 | 17 | 25 |
| 0 | 8 | 16 | 24 |

FIG._7b

|   |   |   |   |
|---|---|---|---|
| 0 | 1 | 2 | 3 |
| 4 | 5 | 6 | 7 |
| 8 | 9 | 10 | 11 |
| 12 | 13 | 14 | 15 |
| 16 | 17 | 18 | 19 |
| 20 | 21 | 22 | 23 |
| 24 | 25 | 26 | 27 |
| 28 | 29 | 30 | 31 |

FIG._7d

| | | | | | | | | | | | | | | | | | | | |
|---|---|---|---|---|---|---|---|---|---|---|---|---|---|---|---|---|---|---|---|
| 0 | 0 | 1 | 1 | 1 | 0 | 1 | 1 | 1 | 1 | 1 | 0 | 1 | 1 | 1 | 1 | 1 | 1 | 1 | 1 |
| 0 | 0 | 1 | 1 | 0 | 0 | 1 | 1 | 1 | 0 | 1 | 0 | 1 | 1 | 0 | 1 | 1 | 1 | 1 | 0 |
| 0 | 0 | 1 | 0 | 1 | 0 | 1 | 1 | 0 | 1 | 1 | 0 | 1 | 0 | 1 | 1 | 1 | 1 | 0 | 1 |
| 0 | 0 | 1 | 0 | 0 | 0 | 1 | 1 | 0 | 0 | 1 | 0 | 1 | 0 | 0 | 1 | 1 | 1 | 0 | 0 |
| 0 | 0 | 0 | 1 | 1 | 0 | 1 | 0 | 1 | 1 | 1 | 0 | 0 | 1 | 1 | 1 | 1 | 0 | 1 | 1 |
| 0 | 0 | 0 | 1 | 0 | 0 | 1 | 0 | 1 | 0 | 1 | 0 | 0 | 1 | 0 | 1 | 1 | 0 | 1 | 0 |
| 0 | 0 | 0 | 0 | 1 | 0 | 1 | 0 | 0 | 1 | 1 | 0 | 0 | 0 | 1 | 1 | 1 | 0 | 0 | 1 |
| 0 | 0 | 0 | 0 | 0 | 0 | 1 | 0 | 0 | 0 | 1 | 0 | 0 | 0 | 0 | 1 | 1 | 0 | 0 | 0 |

FIG._7c

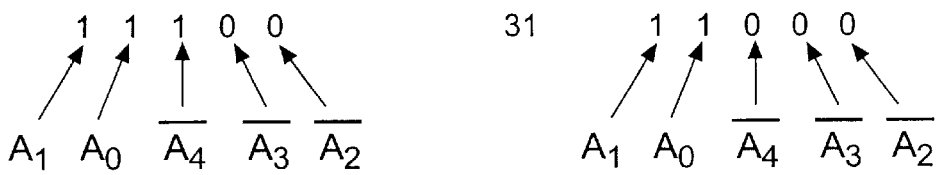
FIG._7e

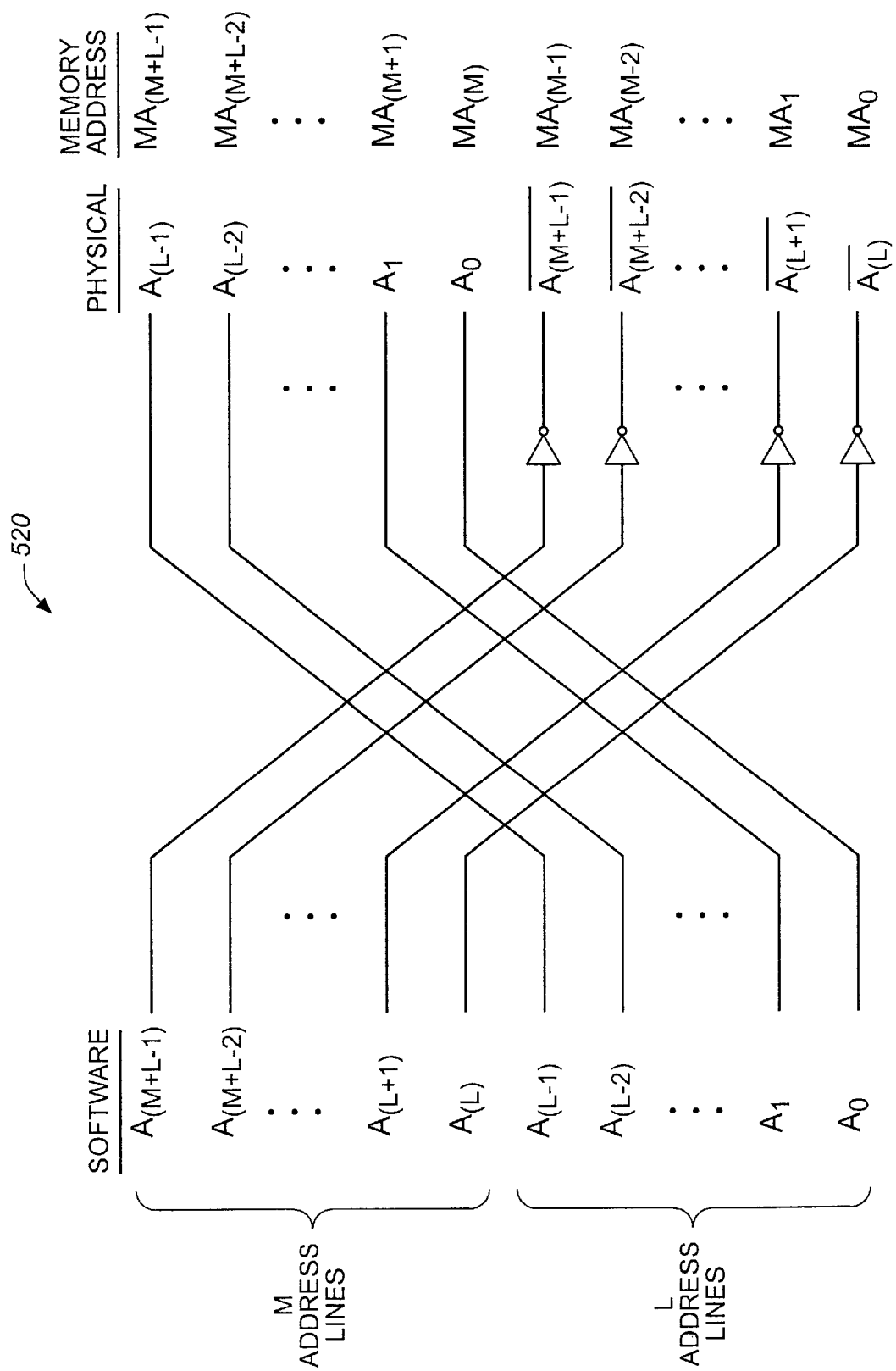
FIG._8

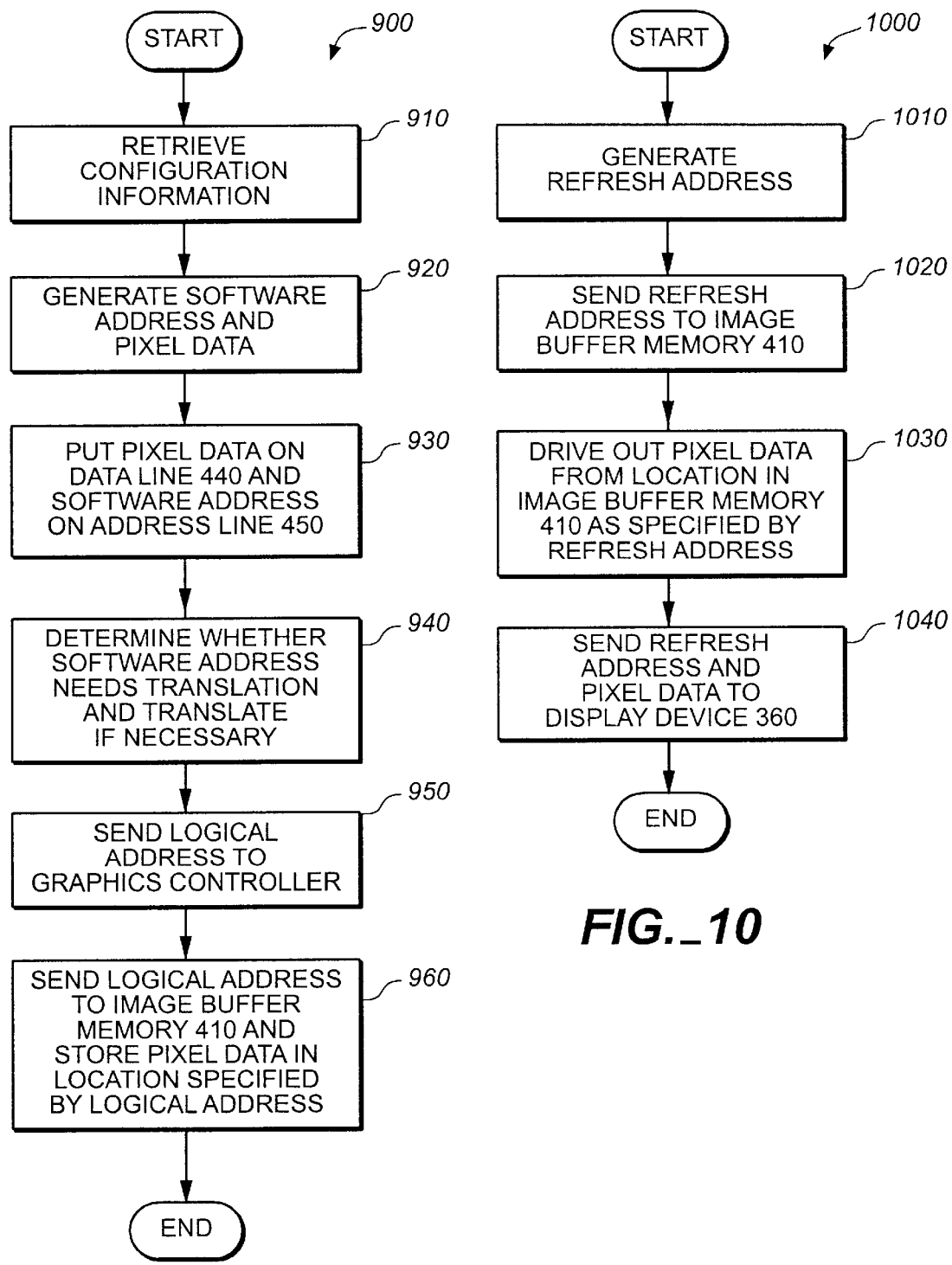

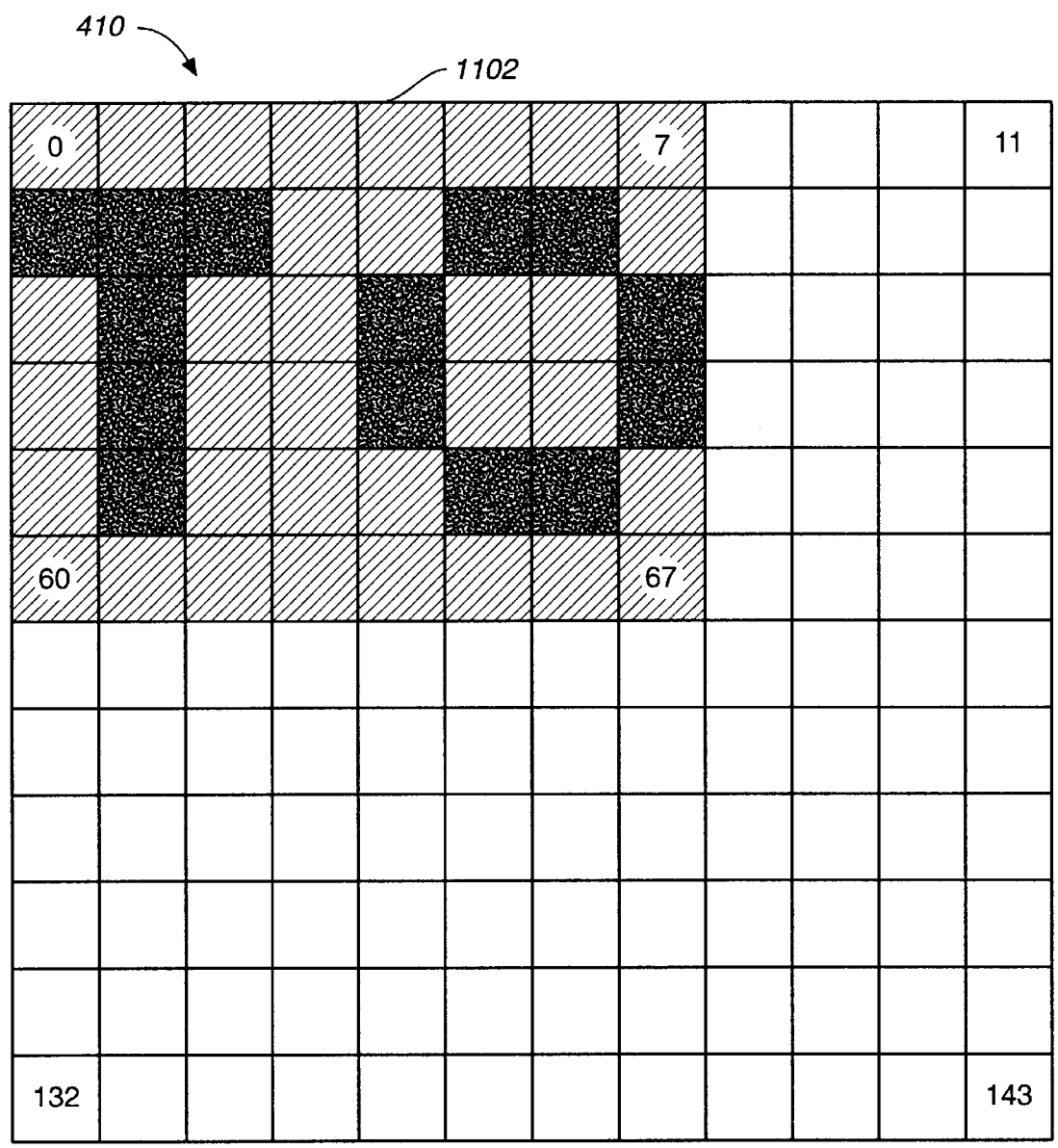
FIG._11

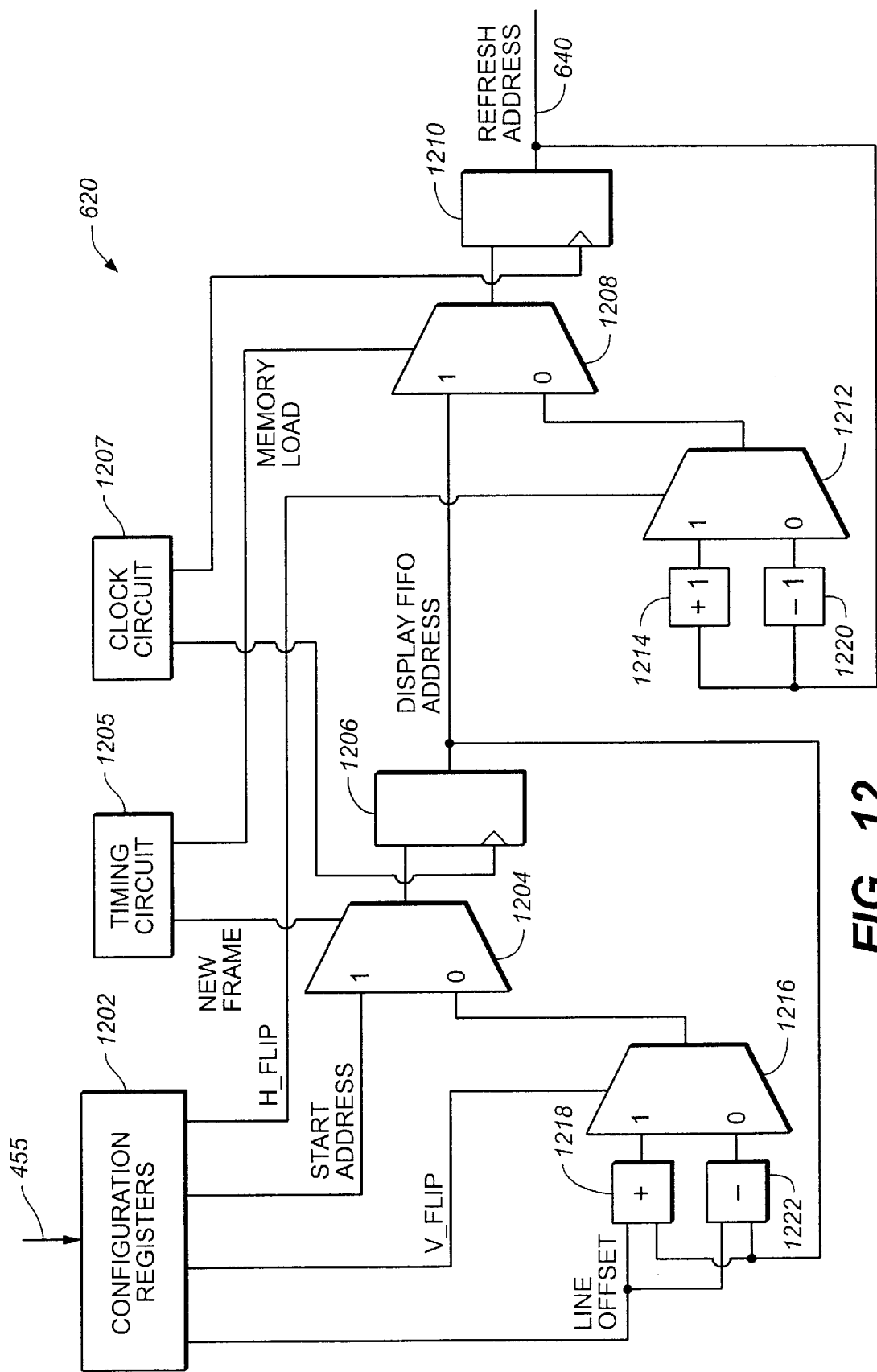
FIG._12

DISPLAY APPARATUS AND METHOD CAPABLE OF ROTATING AN IMAGE BY 180 DEGREES

The present application is a continuation of U.S. patent application Ser. No. 09/153,167, filed on Sep. 15, 1998, issued as U.S. Pat. No. 6,226,016, which is a continuation-in-part of U.S. patent application Ser. No. 09/036,482, filed on Mar. 6, 1998, issued as U.S. Pat. No. 5,956,049 which is a continuation of U.S. patent application Ser. No. 08/596,953, which was filed on Feb. 5, 1996, issued as U.S. Pat. No. 5,734,875 for Hardware that Rotates an Image for Portrait-Oriented Display, and is hereby incorporated in its entirety by reference.

BACKGROUND OF THE INVENTION

Organization of a bitmap defines image dimensions and image orientation, i.e., portrait or landscape. An image is portrait-oriented if its height is greater than its width, and landscape-oriented if its width is greater than its height. FIG. 1(a) depicts a landscape-oriented image bitmap. The width ($W_I$) of the image is greater than its height ($H_I$). FIG. 2(a) depicts a portrait-oriented image bitmap. $H_I$ is greater than $W_I$. The arrows in both corresponding FIGS. 1(a) and 2(a) illustrate software addressing patterns in which pixels values are typically stored to bitmap storage.

To maximize the duty cycle of the display, i.e. to minimize the period of time between successive refresh cycles of a given scan line, display devices such as Cathode Ray Tubes (CRTs) or Liquid Crystal Displays (LCDs) are typically landscape-configured. That is, display devices have physical address schemes which cause pixels to be refreshed in a landscape-oriented pattern. As can be seen by the arrows in FIG. 1(b), the typical landscape-oriented display's refresh operation starts at the top left corner and continues rightward across the first row and downward through the rows.

For some computer systems or applications, it is desirable to have a portrait-oriented display. In such a system, the CRT or LCD would be physically rotated ninety degrees. The arrows in FIG. 2(b) illustrate that, for the physically rotated display, the refresh address scheme is still landscape-oriented: it begins at the original pixel location (rotated ninety degrees counter-clockwise to the bottom left corner now) and continues in the same order.

The software addressing pattern depicted in FIG. 1(a) is the same as the physical address pattern depicted in FIG. 1(b), so landscape-oriented software addresses to landscape-oriented physical addresses do not need to be translated. However, the software addressing pattern depicted in FIG. 2(a) is not the same as the physical address pattern depicted in FIG. 2(b). Thus, portrait-oriented image addresses need translation to a physical address for a portrait-oriented landscape-configured display.

Existing display systems rotate an image ninety degrees by using a program or a special driver to translate software addresses to physical addresses. When the typical rotation program is instructed to draw a bitmap sequence, the program first performs software translation operations to determine new pixel coordinates when rotated 90°, and then performs the drawing operation using those translated coordinates. In some particular drawing operations, additional software may be necessary to treat the rotated drawing as a "special case." For example, to draw text characters in a rotated graphics display would require retrieving the bit-mapped font pixels from font storage in a rotated orientation rather than the normal byte-wise unrotated orientation in which the font data is stored. This may require several additional memory cycles to retrieve this rotated bitmapped font data for just a single line of a given character. In general, the large number of additional read and translation operations for any drawing operation to rotate an image consumes substantial computer processing resources and time. These problems are compounded when larger or more-complex images are rotated.

Additional complexity can arise when the input signal has come to represent a mirrored version of the intended image. This can occur in the situations in which, say, a video camera in a videoconferencing environment is oriented in a normal, horizontal orientation to view human participants but is also provided with a mirror to deflect the field of view downward onto a document. Some systems deal with this reversal by employing video cameras that can reverse their scans. However, this option imposes a significant cost penalty.

SUMMARY OF THE INVENTION

We have developed a way to provide a low-cost way of dealing with the mirror-image problem while at the same time increasing flexibility in portrait-to-landscape conversions. The parent patent application mentioned above addresses the problem of converting between portrait and landscape orientations by performing a conversion of the input address values used to designate the picture locations of picture elements represented by accompanying pixel data. The conversion transforms a pixel's location in a portrait-oriented image into the address of a refresh-memory location that holds data for the corresponding position on a landscape-refreshed display device. Consequently, generating refresh data for the display by scanning the refresh memory in the order corresponding to the display device's scan organization results in the intended appearance if the display device, although being scanned in a landscape manner, is disposed in the correct portrait orientation.

We have recognized that the usefulness of this orientation adjustment can be extended by including a provision for reversing the progression of refresh addresses applied to the refresh memory when the memory's contents are being fetched for application to the display. Specifically, we provide two row-addressing modes and two-column-addressing modes. In one of the column-addressing modes, the progression of column addresses within a row results in increasing column addresses, while it decreases in the other column-addressing mode. Similarly, the row addresses increase as the corresponding display device advances from row to row along its screen if the refresh-address generator is in its row-forward mode, but they decrease if it is in its row-reverse mode.

By thus selectively reversing refresh-address generation, the display system can compensate for mirrored camera images both when the camera is in a portrait orientation and when it is in a landscape orientation. Additionally, by reversing both the refresh-address generation's row scanning and its column scanning, a 90° transformation in one direction performed by refresh-address transformation circuitry to convert from portrait to one landscape orientation can be transformed to the opposite 90° to convert to the other landscape orientation. So providing a simple reversal of column and row scans in refresh-address generation can greatly increase the flexibility afforded by an update-address-transformation circuit that performs a 90° rotation in a fixed direction. Also, both reversals can be used without the 90°-rotation circuitry and thereby afford the effect provided by, for example, certain existing camcorders, of rotating the image by 180° to facilitate viewfinding from otherwise awkward positions.

Other objects and attainments together with a fuller understanding of the invention will become apparent and appreciated by referring to the following description and claims taken in conjunction with the accompanying drawings.

BRIEF DESCRIPTION OF THE DRAWINGS

The invention description below refers to the accompanying drawings, of which:

FIG. 1(a) is a block diagram illustrating a landscape-oriented software addressing pattern;

FIG. 1(b) is a block diagram illustrating a landscape-oriented and landscape-configured display address scheme;

FIG. 2(a) is a block diagram illustrating a portrait-oriented software addressing pattern;

FIG. 2(b) is a block diagram illustrating a portrait-oriented yet landscape-configured display address scheme;

FIG. 3 is a block diagram of a computer system which rotates an image for portrait-oriented display in accordance with the present invention;

FIG. 4 is a block diagram of the graphics system of FIG. 3;

FIG. 5 is a block diagram of the translation system of FIG. 4;

FIG. 6 is a block diagram of the graphics controller of FIG. 4;

FIG. 7(a) is a table illustrating a landscape-oriented four by eight software address matrix;

FIG. 7(b) is a table illustrating the physical address matrix when the display device is rotated counter-clockwise ninety degrees;

FIG. 7(c) is a table illustrating the binary equivalent of the FIG. 7(b) table;

FIG. 7(d) is a table illustrating a portrait-oriented software addressing matrix;

FIG. 7(e) is a table for comparing the physical binary addresses of FIG. 7(c) with the portrait-oriented software address matrix of FIG. 7(d);

FIG. 8 is a schematic diagram of a general case address translation circuit of FIG. 5;

FIG. 9 is a flowchart illustrating a preferred method for mapping a software address to a physical display device address;

FIG. 10 is a flowchart illustrating a preferred method for refreshing a pixel on the display device;

FIG. 11 is a diagram depicting the location in a refresh memory of a refresh-memory block allocated to a given display device;

FIG. 12 is a block diagram of a refresh-address generator employed in a display system that implements the present invention's teachings;

FIG. 13 is a diagram of the display-device image that results from FIG. 11's memory contents when the refresh-address generator operates in its column-reverse mode;

FIG. 14 is diagram of the display-device image that results from FIG. 11's memory contents when the refresh generator operates in its row-reverse mode; and FIG. 15 is a diagram of the display-address image that results from FIG. 11's memory contents when the refresh-address generator operates both in its row-reverse mode and its column-reverse mode.

DESCRIPTION OF THE PREFERRED EMBODIMENTS

In FIG. 3, a typical computer system 300 for rotating and otherwise re-orienting an image in accordance with the present invention includes a Central Processing Unit (CPU) 310, coupled to a processor bus 320, for executing program instructions and memory management routines such as address generation. System 300 also includes a memory 330, peripherals 340, an operating system 350, a graphics system 370 coupled to processor bus 320, and a display device 360 coupled to graphics system 370 that implements the present invention's teachings.

Memory 330 comprises Random Access Memory (RAM), Read-Only Memory (ROM), and secondary disk memory. It typically stores miscellaneous data, an operating system and other programs for execution by CPU 310, and intermediate results of executing programs. Peripherals 340 may include a printer, a floppy disk drive, a keyboard and the like. Display device 360, for example a CRT or an LCD, is typically landscape-configured and displays computer-generated information to a user. The invention can also be used with other types of scanning output devices, such as laser printers. A landscape-configured display device is refreshed in a landscape pattern as in FIGS. 1(b) and 2(b).

Graphics system 370 controls screen-refreshing and image-rendering routines for display device 360. When instructed, graphics system 370 translates portrait-oriented software addresses to physical addresses for portrait-oriented yet landscape-configured display device 360. Although display device 360 is described as landscape-configured, display device 360 can alternatively be portrait configured and the translation function reversed. In accordance with the present invention, system 370 also sequences physical-address generation in such a manner as to reverse the image virtually and/or horizontally.

A software address specifies a location on an image intended for display on display device 360. It can be generated by any software application program such as Microsoft Word by Microsoft Corporation or SuperPaint by Aldus Corporation. The software address scheme depends on the orientation of display device 360. That is, if display device 360 is intended for use in landscape orientation, the software address scheme follows the pattern illustrated in FIG. 7(a). If display device 360 is intended for use in portrait orientation, the software address scheme follows the pattern illustrated in FIG. 7(d). The physical address specifies a location in a buffer memory from which data are fetched to refresh the display. The physical-address scheme is independent of whether the orientation is portrait or landscape. Because the physical address scheme for the rotated case illustrated in FIG. 7(b) is not the same as the software address scheme as illustrated in FIG. 7(d), address mapping between software and physical addresses for the rotated case is necessary. The relationships between FIGS. 7(a), 7(b) and 7(d) are discussed in more detail below.

In accordance with the present invention, moreover, the image may additionally be flipped to produce on the display the mirror image of the buffer-memory contents. The circuitry for accomplishing such a transformation will be described after the orientation-change circuitry is discussed.

FIG. 4 is a block diagram of graphics system 370, which includes an image buffer memory 410, an address-translation system 420, and a graphics controller 430.

Image buffer memory 410 stores a bitmap matrix which defines an image to be presented on display device 360. The bitmap matrix includes sequences of pixel values. Based on the organization of the bitmap matrix, an image can be arranged for landscape or portrait-oriented display. Although image buffer memory 410 is illustrated as a separate memory block from memory 330, system 300 can be implemented using a unified memory architecture.

Image buffer memory 410 receives pixel data on a data line 440 of bus 320 from CPU 310 and a memory address on an address line 470 from graphics controller 430. The received memory address specifies the location in image buffer memory 410 to which the data on line 440 are written or from which the data on line 440 are to be read. Image buffer memory 410 is preferably a static RAM (SRAM) device, since an SRAM is accessed by a unified address and therefore avoids potential page-break inefficiencies as found when using a fast-page (FP) Dynamic RAM (DRAM). However, as long as the DRAM page breaks are managed, an FP-type or other similar type DRAM can alternatively be used.

Address translation system 420 receives an address (generated by the software application program) on an address line 450 of bus 320 from CPU 310 for performing a read or write operation. When performing a write operation, based on the orientation of display device 360, address translation system 420 either passes the received address "as is" to correspond to a landscape-oriented display device 360, or passes the address as translated to correspond to a pixel position on a portrait-oriented display device 360. The address is sent on line 460 to graphics controller 430. This address is referred to as a "logical" address, and specifies an image buffer memory 410 location for storing the pixel data being driven on data line 440.

Graphics controller 430 controls image buffer memory 410 and display device 360. More particularly, graphics controller 430 receives the logical address on line 460 from address translation system 420 and sends the logical address on line 470 to image buffer memory 410. Upon receipt of the address for a write operation, image buffer memory 410 stores the data being sent on line 440 from CPU 310 to the location specified by the received logical address. Upon receipt of the address for a read operation, image buffer memory 410 drives data out on line 440 to CPU 310.

Since the address translation is performed before the image information or data is stored in image buffer memory 410, the image buffer memory 410 bitmap matrix defines the orientation of the image as it will be displayed on display device 360 (subject to reversals to be described below). If the data were stored to image buffer memory 410 without translation, landscape-oriented display device 360 will display a landscape-oriented image. However, if the data were stored to image buffer memory 410 using a translated address, portrait-oriented yet landscape-configured display device 360 will display a portrait-oriented image.

Graphics controller 430 also generates the addresses that it applies to memory 410 when it fetches data from it to refresh the display device 360 refresh address generation, which may be implemented conventionally. Graphics controller 430 sends the refresh address on line 470 to image buffer memory 410 to retrieve the corresponding pixel information on line 480, and passes the refresh address and pixel information on a signal bus 490 to display device 360. Accordingly, display device 360 refreshes the display. As will be explained below, the graphics controller can use the present invention's teachings to generate those addresses in such a manner that the displayed image is a reversed version of the stored image.

FIG. 5 is a block diagram of address translation system 420, which includes a multiplexer 510, an address translation circuit 520, and configuration registers 530.

Configuration registers 530 store display device 360 configuration information such as screen dimensions and the display orientation. The screen dimensions specify the display width ($W_D$) and the display height ($H_D$), both in pixels. The display orientation specifies whether display device 360 is positioned in landscape orientation as illustrated by FIG. 1(*b*) or in portrait orientation as illustrated in FIG. 2(*b*). CPU 310 retrieves the configuration information including the display orientation from Dual In-line Package (DIP) switches set by Original Equipment Manufacturers (OEMs), toggle switches or other means, and stores the information in configuration registers 530. Alternatively, CPU 310 may reverse the order of the dimensions to store 240 pixels per row by 320 pixels per column. Display device 360 is still landscape-configured but the display orientation signal can be determined from the order of the dimensions as stored.

For example, display device 360 may be configured to present 320 pixels per row by 240 pixels per column, and intended to be positioned in portrait orientation. This information may be stored in conventional DIP switches on display device 360. Thus, CPU 310 retrieves the information from the DIP switches and stores the dimensions indicating 320 pixels per row by 240 pixels per column, and a signal indicating portrait orientation, in configuration registers 530.

Address translation circuit 520 converts a portrait-oriented software address to a physical address for a portrait-oriented yet landscape-configured display device 360. That is, address translation circuit 520 receives a software address on line 450 from CPU 310 and reorders the address bits to specify a new pixel address for a pixel location on portrait-oriented display device 360 when rotated counter-clockwise ninety degrees. Although display device 360 can be rotated clockwise ninety degrees and a complementary address translation function implemented, counter-clockwise rotation provides an easier general case translation function.

The translation from portrait-oriented software address space to portrait-oriented, yet landscape-configured, display device 360 address space is based on the function:

$$2^L = H_D$$

or $$L = ln(H_D)/ln\ 2,$$

where $H_D$ is the height in pixels of landscape-oriented display device 360 as illustrated in FIG. 1(*b*). L represents the number of least significant software address bits to re-order as most significant physical address bits.

The translation is based also on the function:

$$2^M = W_D,$$

or $$M = ln(W_D)/ln\ 2,$$

wherein $W_D$ is the width in pixels of landscape-oriented display device 360. M represents the number of most significant software address bits to re-order and invert (complement) as least significant physical address bits. M+L is the total number of address bits specifying both the software and physical addresses.

Address translation circuit 520 passes the new translated address on line 540 to one input of MUX 510, and the software address on line 450 from CPU 310 is received at the second input of MUX 510. Based on the control signal received on line 550 specifying the orientation of display device 360 from configuration registers 530, multiplexer 510 selects one of its two input addresses and passes it as a logical address on address line 460 to graphics controller 430 (FIG. 4).

FIG. 6 is a block diagram of graphics controller 430, which includes a MUX 610, refresh logic 620, and a memory address arbitrator 630. MUX 610 receives refresh address signals on line 640 from refresh logic 620, and logical addresses on line 460 from translation system 420. Refresh logic 620 may employ the present invention's teachings, described below, to generate refresh addresses corresponding to pixel locations on display device 360.

Based on a control signal received from memory address arbitrator 630, MUX 610 selects either the refresh signal from line 640 or the logical address from line 460 and transfers it on line 470 to image buffer memory 410. Arbitrator 630 uses priority and time management schemes to determine which control signal to send. For example, arbitrator 630 may give priority to refresh addresses and enable pipelined refresh addresses for multiple pixel refreshes. When a logical address is selected and sent as the memory address on line 470 to image buffer memory 410 (FIG. 4), the data on line 440 from CPU 310 is written to the image buffer memory 410 location specified by the logical address. When a refresh address is selected and sent as the memory address on line 470 to image buffer memory 410, image buffer memory 410 delivers the corresponding pixel information or data on line 480 to graphics controller 430, which forwards the refresh address and pixel information on line 490 to display device 360.

Thus, CPU 310 writes pixel information or data to and reads information from image buffer memory 410 in the same manner regardless of the orientation of display device 360. No software translation program is needed.

FIGS. 7(a)–7(e) illustrate the portrait-oriented software address to portrait-oriented physical address translation function. More particularly, FIG. 7(a) is a table that illustrates a landscape-oriented four by eight address matrix representing software addresses for a landscape-oriented image and also representing physical addresses for landscape-oriented display device 360. The landscape-oriented software and physical address scheme preferably starts in the top left corner at address "0" and continues across the first row of eight addresses and scans successive rows downward through the four rows. Since the software addresses are the same as the physical addresses, no software to physical address translation is needed.

However, if display device 360 is rotated ninety degrees counter-clockwise and the appropriate configuration information is stored in configuration registers 530 (FIG. 5), then the physical address matrix for display device appears as illustrated in FIG. 7(b). The physical address matrix for rotated display device 360 in FIG. 7(b) now starts in the bottom left corner at address "0" and continues upward through the first column of eight addresses and scans successive columns rightward through the four columns. FIG. 7(c) is a table illustrating the binary equivalent of the numbers in the table of FIG. 7(b). Since there are thirty-two addresses in FIG. 7(a), each address is defined by five binary bits in FIG. 7(c).

Since physical display device 360 has been rotated ninety degrees counter-clockwise, CPU 310 uses a new software address matrix which specifies a portrait-oriented address scheme as illustrated in FIG. 7(d). Thus, the new software address scheme starts at the top left corner at address "0" and continues across the first row of four column addresses and scans successive rows downward through the eight rows. However, the new software address matrix illustrated in FIG. 7(d) is not the same as the physical address matrix illustrated in FIG. 7(b), and thus a translation is needed.

FIG. 7(e) is a table for comparing the portrait-oriented software address matrix of FIG. 7(d) with the physical binary addresses of FIG. 7(c). Applying the above-described FIG. 5 address translation functions to the FIGS. 7(a)–7(e) example gives L=ln 4/ln 2=2, and M=ln 8/ln 2=3. Thus, the invention transposes the two least significant bits A1 and A0 in the software address to the two most significant bits in the physical address. The invention also inverts the three most significant software address bits A4, A3 and A2 and transposes then to the three least significant physical address bits. The translation function re-orders the software address as A1, A0, $\overline{A4}$, $\overline{A3}$, $\overline{A2}$ to generate the logical, and thus physical, address.

When a dimension of display device 360 is not on the order of $2^N$ pixels, then, since display device 360 would not have corresponding locations for all memory spaces addressable by M+L address lines, system 300 implements offsets. To ensure that all logical addresses generated can be mapped to locations on display device 360, offsets may be handled by software or drivers in a conventional manner. These offsets may be stored in configuration registers 530 (FIG. 5), in DIP switches set by OEMs, or elsewhere.

For example, a typical landscape-oriented display device is configured to render 320 pixels per row by 240 pixels per column. Neither 320 nor 240 equals two raised to an integer power. Offsets are therefore needed. First, address translation circuit 520 is designed based on the closest larger address space using dimensions on the order of two raised to an integer power, namely, 512 by 256. Offsets are determined based on this next-larger address space. That is, the 192 rightmost landscape-oriented columns and the 16 bottommost landscape-oriented rows of the available memory space cannot be mapped to locations on display device 360. These offsets are stored and used to prohibit mapping logical addresses to these areas. When display device 360 is rotated 90 degrees counter-clockwise to portrait orientation, the now topmost 192 rows and rightmost 16 columns of available memory space are not mappable.

To avoid offset calculations, display device 360 may be designed to have pixel dimensions equal to two raised to an integer power.

FIG. 8 illustrates a translation circuit 520 designed for a general case address matrix. According to the translation functions described with reference to FIG. 5, L is the number of least significant software address bits to re-order as most significant physical address bits, M is the number of most significant software address bits to invert and re-order as least significant physical address bits, and M+L is the total number of address bits specifying the software or physical address. Therefore, the most significant software addresses $A_{(M+L-1)}$ to $A_{(L)}$ are complemented and mapped to memory address locations $MA_{(M-1)}$ to $MA_0$. The least significant software addresses $A_{(L-1)}$ to $A_0$ are mapped to the memory address locations $MA_{(M+L-1)}$ to $MA_{(M)}$. Further, FIG. 8 illustrates the function for the physical address based on the software address, namely, $A_{(L-1)}$ . . . $A_0$ followed by $\overline{A}_{(M+L-1)}$ . . . $\overline{A}_{(L)}$.

FIG. 9 is a flowchart illustrating a preferred method 900 for mapping a software address to a physical display device 360 address. Method 900 begins in step 910 by CPU 310 retrieving configuration information on display device 360 including display device 360 dimensions and orientation. In step 920, the software application program generates a software address based on pixel data and the retrieved configuration information. If the configuration information specifies a landscape-oriented display device 360, the software application program uses a landscape-oriented software address scheme as illustrated in FIG. 7(*a*). If the configuration information specifies a portrait-oriented display device 360, the software application program uses a portrait-oriented software address scheme as illustrated in FIG. 7(*d*).

In step 930, CPU 310 puts the pixel data on data bus 440 and the software address on address bus 450. The software address is received by address translation system 420, which in step 940 determines whether address translation is necessary. If the configuration information indicates that display device 360 is landscape oriented, no address translation is needed. Otherwise, address translation is needed, in which case the address is translated according to the function described above with reference to FIG. 5. Address translation system 420 generates a logical address, which is either the software address "as is" or else the address translated to specify a pixel location if the display has been rotated counter-clockwise ninety degrees.

In step 940, the logical address is sent on line 460 to graphics controller 430, which in step 950 passes the logical address as a memory address on line 470 to image buffer memory 410. Upon receipt of the memory address, in step 960 image buffer memory 410 stores the pixel data on data line 440 at the specified memory location. Method 900 then ends.

FIG. 10 is a flowchart illustrating a preferred method 1000 for refreshing pixels on display device 360. Method 1000 starts in step 1010 with graphics controller 430 generating a refresh address in a manner that will be described presently. In step 1020 MUX 610 selects the refresh address and passes it as the memory address on line 470 to image buffer memory 410. Upon receipt of the memory address in step 1030, image buffer memory 410 drives out the pixel data on line 480 from the specified location in image buffer memory 410 to graphics controller 430. In step 1040, graphics controller 430 sends the refresh address and the retrieved pixel data via bus 490 to display device 360, which refreshes the location. Method 1000 then ends.

To appreciate the manner in which refresh addresses are generated in step 1010, consider FIG. 11, which is a representation of a small image-buffer memory. FIG. 11 represents that memory as a 12×12 image-memory buffer. That is, it contains enough memory locations to hold pixel values for twelve rows of twelve pixels each. For purposes of illustration, though, we assume that the display is arranged in six rows of eight columns each. Cross-hatched region 1102 represents the memory locations that correspond to the display pixels. The darker shading represents the locations whose contents contain darker pixel values. They will serve as an orientation reference in subsequent drawings.

FIG. 12 depicts in detail the refresh-address generator 620 whose output specifies the addresses of the locations in the dark region 1102. FIG. 12's configuration registers 1202 apply to a row-start multiplexer 1204 a start address that they have received as part of the configuration information from the CPU. At the beginning of a new frame, a timing circuit 1205 momentarily causes the row-start multiplexer 1204 to select this start address as the input to a first-column latch 1206 clocked by row-clock signal from a clock circuit 1207. At the beginning of each scan line, the timing circuit momentarily causes a next-address multiplexer 1208 select latch 1206's resultant output value as the input to an output latch 1210, whose output is the refresh address that FIG. 6's multiplexer 610 applies to the image-buffer memory 410 during refresh operations.

To display FIG. 11's contents without reversal, the start address applied to multiplexer 1204 by the configuration registers 1202 and forwarded as just described to the image-buffer memory 410 as its first address is the value zero, since that is the address at which memory scanning is to begin. After this first value in the current line is loaded, multiplexer 1208 switches state so that it selects as latch 1210's input the output of a next-column multiplexer 1212. The configuration registers 1202 cause multiplexer 1212 to select as multiplexer 1208's input the output of an incrementing circuit 1214. This circuit's output is a value one greater than multiplexer 1210's output, i.e., than the address currently being applied to the image-buffer memory as the location from which the display is being refreshed. So latch 1210's output increases by one when the clock circuit 1207 pulses it. Successive clock signals result in further incrementation, so the image memory is scanned in the direction represented as horizontal in FIG. 11.

After latch 1206 loads in the frame start address at the beginning of a frame, the selection input to multiplexer 1204 changes to the state in which that multiplexer selects as its output the input from a next-row multiplexer 1216. When the display is simply to portray the image-buffer memory 410's contents without reversal, the configuration registers 1202 operate multiplexer 1216 to the state in which it applies to multiplexer 1204's input port the output of an addition circuit 1218. Addition circuit 1218 adds to latch 1206's output a line-offset value that the configuration registers have received from the CPU as part of the configuration information. If the system is employing an image-buffer memory of the dimensions depicted in FIG. 11, this line-offset value is twelve. Therefore, when a row-clock signal clocks first-column latch 1206 at the beginning of a new line, that latch's line-address output increases by twelve. The resultant output is the one that multiplexer 1208 forwards to latch 1210. So, after the address has increased to seven in the first row, the next value produced by the refresh-address generator is twelve, the address of the image-buffer memory location containing the value of the pixel at the start of the next display row.

This operation continues, with latch 1206 being strobed and multiplexer 1208 changing state for one pixel time at the beginning of each row to load in the new first-column address, until the display has been completely refreshed. At that point, multiplexer 1204 is again momentarily operated to select the configuration registers' start-address output, and the address sequence repeats.

In accordance with the present invention, the refresh logic 620 can also assume a column-reverse mode, in which the image is horizontally reversed to generate the display that FIG. 13 depicts. To do this, the circuitry of FIG. 12 operates as before, with the exception that the configuration registers apply a start address of seven rather than zero to the multiplexer 1204, and multiplexer 1212 forwards the output of a decrement circuit 1220 rather than that of increment circuit 1214. Successive pixel clocks therefore cause latch 1210's output to start the frame with a value of seven and decrease to zero at the end of the first row. That output then increases to nineteen at the beginning of the second row and decreases to twelve at the end of that row. This progression continues, with addresses decreasing within rows and increasing between rows, until the full image has been displayed.

The refresh logic 620 can also adopt a row-reverse mode, in which it causes the image-buffer memory's contents to be displayed upside down, as FIG. 14 illustrates. For that purpose, the configuration registers 1202 would produce sixty as the start address and cause multiplexer 1216 to forward a subtraction circuit 1222's output to multiplexer 1203. The subtraction circuit subtracts, rather than adds, the line offset from latch 1206's output. So the address that latch 1206 loads at the start of the second line is forty-eight. As FIG. 14 shows, the memory address should increase on each pixel clock within a row, so multiplexer 1212 chooses its incremented output.

The display that FIG. 13 depicts can be thought of as being the result of flipping the image-buffer memory's contents about a bisecting vertical axis, while FIG. 14's display can be thought of as the result of flipping it about a bisecting horizontal axis. These reversals can be used to correct mirrored images, as was mentioned above. Additionally, by operating in the row-reverse and column-reverse modes simultaneously, the FIG. 12 circuit can produce the results of flipping those contents about each axis in succession to produce the display that FIG. 15 depicts.

As was mentioned above, address-translation circuitry 520 performs a counterclockwise rotation because a rotation in that direction is convenient to implement. Still, there may be situations in which a clockwise rotation is preferred. Such a rotation can be achieved without changing counterclockwise-rotation circuitry if FIG. 12's refresh address generator operates in the row-reverse and column-reverse modes together. This result can be achieved by employing a start-address value of sixty-seven, causing multiplexer 1216 to forward its subtracted input, and causing multiplexer 1212 to forward its decremented input.

It is apparent that the present invention's teachings yield display systems a considerable degree of flexibility. It therefore constitutes a significant advance in the art.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A graphics system for rotating an image for display from a first orientation to a second orientation comprising:
   a first input that receives image pixel data signals representing picture elements successively in columns across rows, and in rows across a screen;
   a second input that receives image pixel address signals successively identifying the row and column of corresponding pixel data signals in the first orientation;
   an address translation system that receives said image pixel address signals and translates them into translated address signals successively identifying the column and row of corresponding pixel data signals representing picture elements successively in rows across columns, and in columns across a screen in the second orientation, and selectively outputs one of said image pixel address signals and said translated address signals as logical address signals;
   refresh logic that generates screen refresh address signals;
   a multiplexer that receives said logical address signals and said refresh address signals, and is responsive to a select signal to select one of said address signals and pass it as a memory address signal; and
   a memory address arbitrator that generates said select signal.

2. A graphics system for rotating an image for display on a landscape-configured display with a landscape-oriented height ($H_D$) in pixel-lines and width ($W_D$) in pixel-lines, the graphics system comprising:
   an input terminal that receives a software address and corresponding pixel data;
   an address translation system comprising
   (i) configuration registers that store a flag representing orientation of a display;
   (ii) a translation circuit that translates the software address as a translated address according to the functions L=ln ($H_D$)/ln 2 and M=ln($W_D$)/ln 2, wherein L specifies the number of least significant bits in the software address to copy as the most significant bits in the translated address, and M specifies the number of most significant bits in the software address to invert and then copy as the least significant bits in the translated address; and
   (iii) a selector that selectively outputs the software address as a logical address when the flag indicates landscape orientation, and outputs the translated address as the logical address when the flag indicates portrait orientation; and
   refresh address generation circuitry that generates a refresh address; and
   arbitration circuitry that selects one of the refresh address and the logical address as a selected address.

3. A method for rotating an image for display on a graphic display having a first orientation with a pixel height ($H_D$) and pixel width ($W_D$), to a second orientation, comprising:
   retrieving configuration information indicating a display orientation;
   generating a software address representing an image position on a display and generating corresponding pixel data;
   when the display orientation indicates the first orientation, selecting the software address as a logical address; and
   when the display orientation indicates the second orientation, translating the software address based on the functions L=ln ($H_D$)/ln 2 and M =ln ($W_D$)/ln 2, wherein L represents the number of least significant software address bits to copy as the most significant translated address bits, and M specifies the number of most significant software address bits to invert and then copy as the least significant translated address bits, and selecting the translated address as a logical address.

4. The method for rotating an image for display on a graphic display according to claim 3 wherein said first orientation is a landscape orientation and said second orientation is a portrait orientation.

* * * * *

UNITED STATES PATENT AND TRADEMARK OFFICE
CERTIFICATE OF CORRECTION

PATENT NO.   : 6,765,581 B2
DATED         : July 20, 2004
INVENTOR(S)  : Brett Anthony Cheng It is certified that error appears in the above-identified patent and that said Letters Patent is hereby corrected as shown below:

<u>Title page,</u>
Item [56], References Cited, U.S. PATENT DOCUMENTS, please add the following references:

| | |
|---|---|
| --5,432,720 | 7/11/95, Lucente et al. |
| 5,199,101 | 3/30/93, Cusick et al. |
| 5,133,076 | 7/21/92, Hawkins et al. |
| 4,716,533 | 12/29/87, Ohmori |
| 4,776,026 | 10/04/88, Ueyama |
| 4,952,920 | 8/28/90, Hayashi |
| 5,450,542 | 9/12/95, Lehman et al. |
| 5,606,348 | 2/25/97, Chin |
| 5,563,625 | 10/8/96, Scott |
| 5,577,182 | 11/19/96, Hayashi |
| 5,613,018 | 3/18/97, Eldridge |
| 5,634,088 | 5/27/97, Banton |
| 5,668,980 | 9/16/97, Schieve |
| 5,670,982 | 9//23/97, Zhao |
| 5,692,210 | 11/25/97, Mita et al. |
| 5,715,385 | 2/3/98, Stearns et al. |
| 5,566,098 | 10/15/96, Lucente et al. |
| 5,384,645 | 1/24/95, Hasegawa et al. |
| 5,712,714 | 1/27/98, Sasahara |
| 5,598,181 | 1/28/97, Kermisch |
| 5,047,958 | 9/10/91, Comins et al. |
| 4,375,638 | 3/1/83, O'Keefe et al. |
| 5,956,049 | 9/21/99, Cheng-- |

FOREIGN PATENT DOCUMENTS, please add the following references:

| | |
|---|---|
| --WO | 91/00586, 1/91 |
| EP | 0 582 824, 2/94-- |

UNITED STATES PATENT AND TRADEMARK OFFICE
CERTIFICATE OF CORRECTION

PATENT NO. : 6,765,581 B2
DATED : July 20, 2004
INVENTOR(S) : Brett Anthony Cheng It is certified that error appears in the above-identified patent and that said Letters Patent is hereby corrected as shown below:

Column 12,
Line 6, after "select" delete "signal." and insert

--signal; and wherein said address translation system comprises:

an address translation circuit that receives said image pixel address signals and translates them into translated address signals; and a logical address selector that receives said image pixel address signals and said translated address signals and selectively outputs one of said image pixel address signals and said translated address signals as said logical address signals.--

Signed and Sealed this

Fourteenth Day of December, 2004

JON W. DUDAS
*Director of the United States Patent and Trademark Office*